United States Patent [19]

Johnson

[11] Patent Number: 4,575,664

[45] Date of Patent: Mar. 11, 1986

[54] TACHOMETER CHECK APPARATUS

[75] Inventor: Frederick O. Johnson, Monroeville, Pa.

[73] Assignee: Westinghouse Electric Corp., Pittsburgh, Pa.

[21] Appl. No.: 588,637

[22] Filed: Mar. 12, 1984

[51] Int. Cl.⁴ .............................................. H02P 5/00
[52] U.S. Cl. ................................. 318/327; 318/314; 318/326; 318/628; 318/345 A; 324/161; 324/162; 324/163
[58] Field of Search ................ 318/311, 312, 313, 314, 318/315, 316, 317, 318, 326, 327, 345 A, 490, 618, 628; 324/160–166

[56] References Cited

U.S. PATENT DOCUMENTS

| | | | |
|---|---|---|---|
| 3,512,128 | 5/1970 | Maki | 324/161 X |
| 3,576,485 | 4/1971 | Coons, Jr. | 318/327 X |
| 3,588,680 | 6/1971 | Athey | 324/161 X |
| 3,733,557 | 5/1973 | Fujinami | 324/162 X |
| 3,790,874 | 2/1974 | Klimo | 324/163 X |
| 3,803,425 | 4/1974 | Carp | 324/161 X |
| 4,085,363 | 4/1978 | Gravina et al. | 324/162 |
| 4,216,419 | 8/1980 | Van Dam et al. | 318/327 |
| 4,275,342 | 6/1981 | Kawada et al. | 318/490 |
| 4,506,339 | 3/1985 | Kühnlein | 324/163 X |

Primary Examiner—William M. Shoop, Jr.
Assistant Examiner—Shik Luen Paul Ip
Attorney, Agent, or Firm—M. J. Moran

[57] ABSTRACT

An electronic motor control system is taught herein which utilizes a tachometer check circuit. The tachometer check circuit is an electrical circuit which is interconnected with the output terminals of the tachometer. The circuit is utilized when the tachometer is at standstill to determine if the tachometer is functional, that is, is it internally correctly wired to produce an expected signal upon rotation. If such is the case, then motor start-up may take place. A second test is performed after motor start-up for determining if an appropriate amount of output voltage is being produced by the tachometer during the start-up phase. This is based on expected values of voltage during a short period of time after start-up. If such is not the case, the motor control system is disabled and the motor is stopped. The system is utilized for embodiments which include AC tachometers as well as DC tachometers used on unidirectional or bidirectional rotational systems.

1 Claim, 3 Drawing Figures

TACHOMETER CHECK APPARATUS

BACKGROUND OF THE INVENTION

1. Field of the Invention

The subject matter of this invention relates generally to electrical circuits for checking tachometers and relates more specifically to electrical circuits which are utilized to determine whether a tachometer is correctly wired internally and whether it is providing the expected output voltage when it is utilized in a motor controller application.

2. Description of the Prior Art

The use of electrical tachometers is well known. In particular, an electrical tachometer is essentially a voltage generator which is interconnected with the shaft of a rotating device and calibrated to produce a voltage output which is related to the speed of the device. In some instances, this voltage output signal is fed back to an electrical control system which in turn is utilized to monitor, check or otherwise control the speed of the device being monitored by the tachometer. A disadvantage with the aforegoing mentioned system lies in the fact that the integrity of the tachometer is an integral part of the closed loop and if the tachometer is providing an improper or erroneous signal, action may be taken by the control signal which is inappropriate or even dangerous. It will be advantageous therefore if apparatus or circuitry could be found which could be utilized in conjunction with the closed loop system which includes the tachometer to determine the reliability of the tachometer for accomplishing its desired purpose.

SUMMARY OF THE INVENTION

In accordance with the invention, a speed control motor system is taught which utilizes a motor controller which is interconnected with an electrical motor to be controlled thereby. A tachometer is interconnected with the shaft of the electrical motor. The output voltage at the terminals of the tachometer is indicative of the angular velocity of the motor. This signal is provided to the motor controller for being utilized by the motor controller to maintain the angular velocity of the motor at a predetermined value. A tachometer check circuit is interconnected with the tachometer for testing the tachometer for determining if the tachometer system is internally interconnected with the output voltage terminals thereof. Testing may occur in a non-rotating state or in a rotating state. In the non-rotating state, the integral interconnection of the tachometer is checked. In the rotating state, the output voltage of the tachometer is tested to determine if its value approximates an expected value at a short time after start-up.

BRIEF DESCRIPTION OF THE DRAWINGS

For a better understanding of the invention, reference is made to the preferred embodiments thereof shown in the accompanying drawings in which.

DESCRIPTION OF THE PREFERRED EMBODIMENTS

Figure 1:
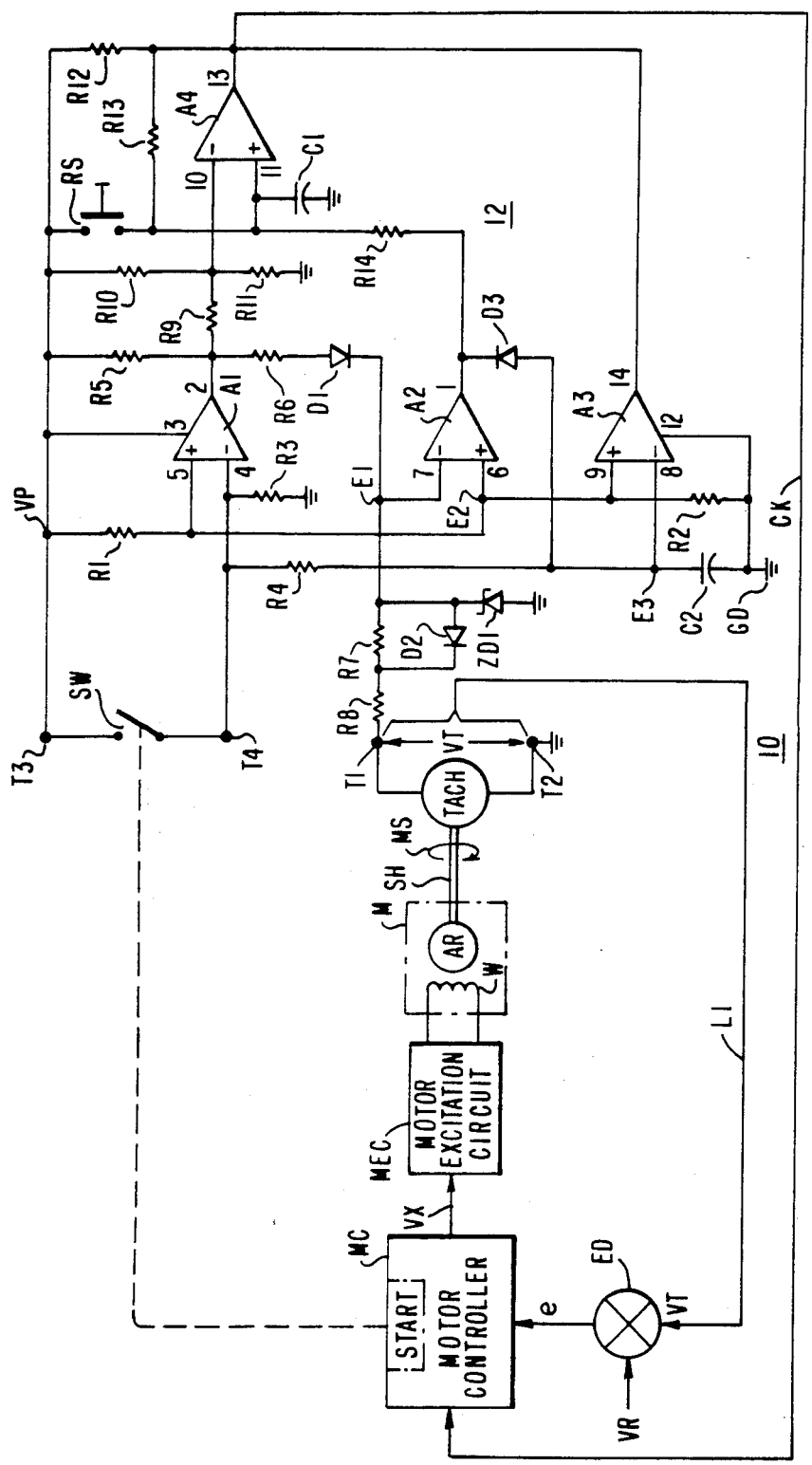
FIG. 1 shows an electrical schematic drawing partially in block diagram form for an electrical motor and its attendant motor control system for a DC tachometer.

Referring now to the drawings and to FIG. 1 in particular, there is shown an electrical schematic drawing and block diagram for a motor M with its attendant motor control system 10. In this embodiment of the invention, the motor M is a DC motor having an armature AR which drives an appropriate load at a predetermined motor speed or angular velocity MS. The shaft SH of the motor M interconnects the armature AR with an appropriate tachometer device TACH so that motor speed or angular velocity feedback control may be implemented. The output voltage VT of the tachometer TACH is related to or proportional to the motor speed MS. The voltage VT is developed across output terminals T1 and T2. Voltage VT is fed back by way of an appropriate voltage transmission line or conductor L1 to an error detector ED where voltage VT is compared with a reference speed voltage signal VR which in a preferred embodiment of the invention may be adjusted, in a manner not shown, to correspond to a desirable value for the motor speed MS. A resulting error signal e is produced by the error detector ED and is supplied to a motor controller MC for use thereby.

An appropriate start button START on the motor controller MC may be utilized to supply a motor excitation voltage VX to the motor excitation circuit MEC of the motor M. The motor excitation circuit MEC controls the excitation of a motor so as to cause the shaft SH to rotate at an appropriate and desired value of motor speed MS. Generally, when the tachometer output voltage VT is equal to the reference speed signal voltage VR at the error detector ED, the motor speed MS is at the appropriate value.

The effectiveness of the motor control system 10 is determined in part by the reliability of the tachometer TACH to perform its assigned function. Therefore any knowledge which can be gathered concerning the integrity or reliability of the tachometer TACH to perform its assigned function is desirable. Any knowledge related to the inability of the tachometer to perform its assigned function can be utilized to prevent a motor start or to stop the motor once started so that undesirable results such as, for example, catastrophic failure or undesired tripping of supplemental circuit protective apparatus can be avoided. Two things are ascertainable about the capability of the tachometer TACH for performing its assigned function, namely: (1) is the tachometer TACH present in the first place, that is, is it properly interconnected electrically between the terminals T1 and T2; and (2) soon after a start operation for the motor M is the tachometer TACH providing at least a minimum output voltage VT associated with a shaft SH turning at a minimum value of shaft speed MS?

To answer the above-stated questions, a tachometer check circuit 12 is interconnected as a part of the motor control system 10 for providing a check on the usefulness of the tachometer TACH as a feedback element in the system 10. The circuit 12 is interconnected in the system 10 at the terminals T1 and T2 and to the motor controller start button START and to the motor controller logic system by way of the electrical line CK.

The check circuit 12 is interconnected with the start button START for the motor controller MC at a pair of input terminals T3 and T4 by a switch SW which may be ganged with the start button START. An appropriate positive power supply voltage VP is connected to terminal T3. The other side of the power supply (not shown) may be interconnected with the ground terminal or system common terminal GD. The power supply may, in a preferred embodiment of the invention, be a 15 volt DC power supply. In the embodiment of the invention described with respect to circuit 12, a DC tachometer TACH is connected between the terminals T1 and T2 with expected motor rotation to be unidirectional. Check circuits for DC tachometers and AC tachometers are described hereinafter with respect to other embodiments of the invention. Terminal T3 is connected to the positive power supply voltage terminal VP. Also interconnected with positive power supply terminal VP is one side of a resistive element R1, the other side of which is connected to one side of a resistive element R2, the non-inverting input terminal "5" of a comparator A1, the non-inverting input terminal "6" of a comparator A2 and the non-inverting input terminal "9" of a comparator A3. The other side of resistive element R2 is connected to system common or ground GD. Connected to the terminal T4 are one side of a resistive element R3, one side of a resistive element R4 and the inverting input terminal "4" of the aforementioned comparator A1. Also connected to the positive input terminal VP is one side of a resistive element R5, the other side of which is connected to one side of a resistive element R6 and to the output terminal "2" of the aforementioned comparator A1. The other side of the resistive element R6 is connected to the anode of a diode D1, the cathode of which is connected to one side of a resistive element R7, to the anode of a second diode D2, and to the regulating terminal of a zener diode ZD1. The anode of the zener diode ZD1 is connected to ground terminal GD. The other side of the resistive element R7 and the cathode of the diode D2 are connected to one side of a resistive element R8, the other side of which is connected to terminal T1. Terminal T2 is connected to system common or ground GD. Also connected to the output terminal "2" of the comparator A1 is one side of a resistive element R9. Connected to the power supply positive terminal VP is one side of a resistive element R10, the other side of which is connected to the other side of the resistive element R9, to one side of a resistive element R11 and to the inverting terminal "10" of a comparator A4. The other side of the resistive element R11 is connected to ground GD. Also connected to the positive power supply terminal VP is one side of a resistive element R12, the other side of which is connected to one side of a resistive element R13 and to the output terminal "13" of comparator A4. The other side of the resistive element R13 is connected to one side of a resistive element R14, one side of a capacitive element C1 and to the non-inverting terminal "11" of the comparator A4. The other side of the capacitive element C1 is connected to ground GD. The other side of the resistive element R14 is connected to the output terminal "1" of the comparator A2 and to the cathode of a diode D3. The anode of the diode D3 is connected to the other side of the resistive element R4, to one plate of a capacitive element C2 and to the inverting terminal "8" of the comparator A3. The other side of the capacitive element C2 is connected to ground GD. The cathode of the diode D1 is also connected to the inverting terminal "7" of the comparator A2. Also connected to the positive power supply voltage line VP is one side of a reset switch RS, the other side of which is connected to the other side of the resistive element R13 and consequently to the non-inverting input terminal "11" of the capacitor A4. The inverting input terminal "7" of the comparator A2 is designated as voltage node E1. The positive or noninverting input terminal "6" of the comparator A2 is designated as voltage node E2 and the inverting input terminal "8" of the comparator A3 is designated as voltage node E3. The output terminal "13" of the comparator A4 is connected to output terminal "14" of the comparator A3 and to the check line CK and is fed back to the motor controller MC.

Check circuit 12 is capable of being in any one of four states, depending upon the status of switch SW and the status of the tachometer TACH. The four states are as follows: (1) tachometer at a standstill and interconnected with the terminals T1 and T2 in a safe disposition, (2) tachometer at a standstill and interconnected with the terminals T1 and T2 in an unsafe or failed disposition, (3) tachometer in a state of rotation and producing a voltage value VT which is recognized as being a safe level of voltage, or (4) tachometer rotating and producing a voltage value VT which represents a failed or unsafe voltage level. If the tachometer is at a standstill and in a safe state or if the tachometer is rotating and providing a safe level of voltage VT, the feedback signal along the line CK for the motor controller MC will alert the motor controller that the tachometer TACH is functioning properly. If, on the other hand, the tachometer TACH is at a standstill and in an unsafe or failed state or if the tachometer is rotating and producing an output voltage value VT which is considered unsafe or failed, the feedback line CK will provide a signal to the motor controller MC which indicates a failed or otherwise unreliable tachometer TACH. The latter signal is (or may be) utilized by the motor controller MC to cause a shutdown or prevent a startup of the motor M.

OPERATION OF THE DIRECT CURRENT TACHOMETER CHECKER

The switch SW is disposed in an open state in correspondence with the disposition of the motor controller being in a state which should cause the motor armature AR to be non-rotating. In such a disposition the voltage divider represented generally by the combination of the resistive elements R1 and R2 is such as to put a 2.5 volt DC signal at node E2. This voltage signal is consequently on the non-inverting input terminals "5", "6" and "9" of the comparators A1, A2 and A3, respectively. Concurrently, voltage node E3 is at approximately 0 volts as it is interconnected with the system common or ground GD through the series resistive elements R3 and R4. This puts approximately 0 volts on the inverting input terminals "4" and "8" of the comparators A1 and A3, respectively. It also puts near zero voltage on the anode of the diode D3.

The aforementioned comparator elements A1, A2, A3 and A4 may, in a preferred embodiment of the invention, be conveniently mounted on a single silicon chip. Consequently, the interconnection of the terminal "3" of the first comparator element A1 with the positive power supply voltage VP and the interconnection of the terminal "12" of the comparator element A3 with the ground GD allows the output of each of the comparators to be at a high or state which is external circuit determined or a low or near zero voltage state, depending upon the status of the voltages on the inverting and non-inverting input terminals thereof. If the voltage on the non-inverting input terminal is higher than the voltage on the inverting input terminal in each case, the output of the respective comparators will be high. The output of the respective comparators will be low if the voltage on the non-inverting terminal is lower than the voltage on the inverting terminal in each case. Such being the case it can be seen that the output "2" of comparator A1 will be high and the output "14" of the comparator A3 will be high. The output terminal of the comparator A3 is interconnected with the output terminal of the comparator A4. The comparators A1–A4 for example are such that if the output terminals thereof are tied together, a low state will always control, that is, if one of the outputs is low, the value of the common terminal is low and only if all of the outputs are high is the output of the common terminal high. Consequently, since the check line CK is interconnected with the output of the comparator A4 and the output of the comparator A3, it will only be high if the outputs of both those comparators are high and it will be low if the output of any one of those comparators is low. It can be seen, therefore, that since in the present situation the output of the comparator A3 is high, the check line CK will adopt the status of the output of the comparator A4. This has the effect of neutralizing or removing the comparator A3 from the circuit for the present test. The output of the comparator A2 will be high or low depending upon the relative relationship of the voltage at node E1 to the voltage at node E2. If the voltage at E1, which is interconnected with the inverting terminal "7" of the comparator A2, is lower than the voltage at E2, which is interconnected with the non-inverting terminal "6" of the comparator A2, then the output "1" of the comparator A2 will be high. If, on the other hand, the voltage at E1 is larger than voltage at E2, the output of the comparator E2 will be low or near zero voltage. The voltage at E1 is high or low depending upon the relationship of the voltage divider formed by the resistive elements R5, R6, R8 and the resistance between the terminals T1 and T2 of the tachometer TACH. In a preferred embodiment of the invention the resistive element R5 is 2,000 ohms, the resisitve element R6 is 3,000 ohms and the resistive element R8 is 100 ohms. If there is sufficiently low resistance between the terminals T1 and T2, which is indicative of a properly interconnected and reliable tachometer TACH, the voltage at E1 will be very close to zero and the output terminal "1" of the comparator A2 will be high. This has the tendency to reverse bias the diode D3 and to place a relatively high voltage on the non-inverting terminal "11" of the comparator A4. The voltage on the inverting terminal "10" of the comparator A4 is determined by the voltage divider formed by the resistive elements R5, R9, R10 and R11 utilized in conjunction with the ground GD, terminal voltage VP and the status of the output terminal "2" of the operational amplifier A1, which as has been described previously, is in the high state for the present test. In the preferred embodiment of the invention the voltage on the inverting terminal "10" of the comparator A4 is approximately 7.5 volts, which is significantly lower than the voltage on the non-inverting terminal "11" and consequently a high voltage exists on the output terminal "13" of the comparator A4 and consequently on the check line CK. This is indicative to the motor controller MC that the tachometer TACH is in a safe state at standstill.

If, however, the tachometer TACH is not in a safe state at standstill, which is caused by a discontinuity in the electrical wiring between the terminals T1 and T2 for instance, voltage at E1 must rise to approximately the value of the positive power supply voltage VP regulated only by the regulating terminal of the zener diode ZD1. The regulating voltage of the zener diode ZD1 is purposely made to be higher than the voltage at E2 for this operation so that the output of the comparator A2 is in its inverted or low voltage state. This pulls the voltage on the non-inverting terminal "11" of the comparator A4 down to a low value relative to the voltage on the inverting terminal "10" thereof. This has the effect of providing a low output value on the output terminal "13" of the comparator A4, which is interconnected with the check line CK, thus providing a low or unsafe signal to the motor controller MC to indicate that the tachometer TACH is in an unsafe state at standstill. It can be seen, therefore, that at standstill the check circuit 12 essentially checks the integrity of the continuity of wiring between the terminals T1 and T2 of the tachometer TACH. The integrity could be failed because the tachometer is internally damaged or otherwise non-functioning or because an interconnecting line between the tachometer TACH and the terminals T1 and T2 is broken or otherwise failed. If the voltage at the output terminal "13" of the comparator A4 goes low, this is fed back by way of resistive element R13 to the non-inverter input terminal "11" thereof latching the low output even if the problem in the tachometer TACH is corrected. This will continue until the reset switch RS is depressed which will place a higher voltage on point "11" of comparator A4. Capacitive element C1 acts to filter out transient and short duration signals so that comparator A4 is not actuated by noise, for example.

When an operator attempts to start the motor by activating the START switch of motor controller MC, the motor excitation voltage VX is supplied to the motor excitation circuit MEC which may energize a winding W which creates an electric field which causes the rotor AR of the motor to begin to rotate. This in turn causes the tachometer to begin to rotate correspondingly. As the speed MS of the armature AR increases, the output voltage VT of the tachometer TACH increases accordingly. The likely relationship is one of proportionality. The voltage signal VT is the one which is compared against the reference signal VR which is then fed back as the error signal e to the motor controller MC. The actuation of the start button START on the motor controller MC closes the switch SW, thus essentially providing the power supply voltage VP to the inverting terminal "4" of the comparator A1. This causes the output terminal "2" of the comparator A1 to shift to the low or near zero state. This does two things simultaneously. First, it reverse biases the diode D1, consequently allowing the voltage at E1 to be a generally linear function of the output voltage VT of the tachometer TACH. It also places one side of the resistive element R9 at or near ground potential, thus placing resistive elements R9 and R11 in a relative disposition of parallel circuit relationship. These two resistive elements operate in combination with resistive element R10 to form a voltage divider between the positive power supply voltage VP and ground GD, thus placing a designated voltage on the inverting terminal "10" of the comparator A4. In the preferred embodiment of the invention, resistive elements R9, R10 and R11 are 100 kilohms and the aforementioned voltage divider relationship becomes a 1:3 relationship, thus placing approximately 5 volts on the inverting terminal "10" for a 15 volt power supply voltage VR. The voltage on the non-inverting terminal "11" is a function of the resistive elements R12, R13, R14, the voltage at the output terminal of the comparator A2 and the positive power supply voltage VP. It can be seen that regardless of whether the output voltage of the comparator A2 is high or low, the interaction of the aforementioned elements in voltage divider relationship is such that in a preferred embodiment of the invention the voltage on the non-inverting terminal "11" of comparator A4 will be higher than the voltage on the inverting terminal "10" thereof. This means that the output of the comparator A4 will be high. Since the output of the comparator A4 and the output of the comparator A3 are interconnected, this has the effect of allowing the output of the comparator A3 to control the signal on the check line CK. In the preferred embodiment of the invention the resistive element R12 is 10 kilohms, resistive element R13 is 100 kilohms and the resistive element R14 is 75 kilohms. It can be seen therefore that the voltage at the non-inverting terminal "11" will be higher than the voltage at the inverting terminal "10". Prior to the closing of the switch SW the voltage at E3 is approximately zero volts which causes the capacitive element C2 to have zero volts impressed thereacross. After the closing of the switch SW, the voltage at E3 is a function of the time constant of the cooperative resistive element R4 and capacitive element C2. As the capacitor or capacitive element C2 charges from the positive voltage source VP, the voltage on the inverting terminal "8" of the comparator A3 begins to increase from 0 towards 15 volts. It will be noted that the voltage at E2 remains unchanged regardless of the status of the switch SW. If the voltage at E3 is allowed to increase to a value above the voltage on the non-inverting input terminal "9" of the comparator element A3, the output state of the comparator A3 will change from high to low, thus providing an indication on the check line CK of a failure to the motor controller MC. This will occur if the voltage at E1, which is essentially the output voltage of the tachometer VT, does not increase to a voltage above that at E2 voltage before the voltage at E3 does. The tachometer TACH has a known speed versus voltage output characteristic. The circuit 12 is so designed that for a normally functioning tachometer TACH the voltage at E1 will increase above the voltage at E2 much more quickly than the voltage at E3 will increase above the voltage at E2. If this happens, the output terminal "1" of the comparator A2 will switch from a high state to a low state, thus forward biasing the diode D3 and preventing further charging of the capacitive element C2, thus assuring that the voltage at E3 will not exceed the voltage at E2. Of course if such happens, the output of the comparator A3 will remain high for the remainder of the operation or until the switch SW is opened again. In a preferred embodiment of the invention for a properly functioning tachometer TACH, the voltage VT (or E1) will exceed the voltage at E2 within 500 milliseconds after the start switch START has been thrown, whereas the voltage at E3 if allowed to increase at a rate determined by the RC time constant R4—C2, will not exceed the voltage value at E2 for 750 milliseconds. If, on the other hand, the tachometer TACH is non-functioning so that the voltage VT does not approximate the expected voltage produced by the tachometer as the motor speed MS increases, the voltage at E1 will not rise above the voltage at E2 before the voltage at E3 rises above the voltage at E2. If the voltage at E3 exceeds the voltage at E2 before the voltage at E1 exceeds the voltage at E2, the output of the comparator A3 at point "14" will switch to low, thus providing a low output signal on the feedback line CK to the motor controller MC. This low signal will be latched by way of resistive element R13 into the non-inverting terminal "11" of the comparator A4. In the event an unsafe or failing tachometer signal is present on the check line CK, the motor controller MC will (or may) operate to stop the armature AR of the motor M from turning.

It is expected that tachometer TACH will reach approximately 200 volts full scale within 5 to 20 seconds depending upon the particular tachometer being monitored. The time constant R4—C2 chosen for the comparator A3 is such that the switchover voltage, that is, the voltage where E3=E2, occurs in approximately one-half of a second. That is, the voltage at E3 will equal ten volts approximately two seconds after the switch SW is closed. Assuming that the voltage rises at a rate which is approximately linear during the first part of the charging curve, it can be seen that the capacitor will charge to $2\frac{1}{2}$ volts, i.e. the value at E2, in about one-half second. Using the worst case approximation for the tachometer, that is a tachometer which charges to 200 volts full scale in 20 seconds, and again assuming a linear rate, it can be seen that if the tachometer TACH is functioning in a safe and reliable manner, the voltage at E1 will reach $2\frac{1}{2}$ volts in one-fourth of a second, thus causing the comparator A2 to switch from the high state to the low state, thus causing the capacitor C2 to cease being charged.

Figure 2:
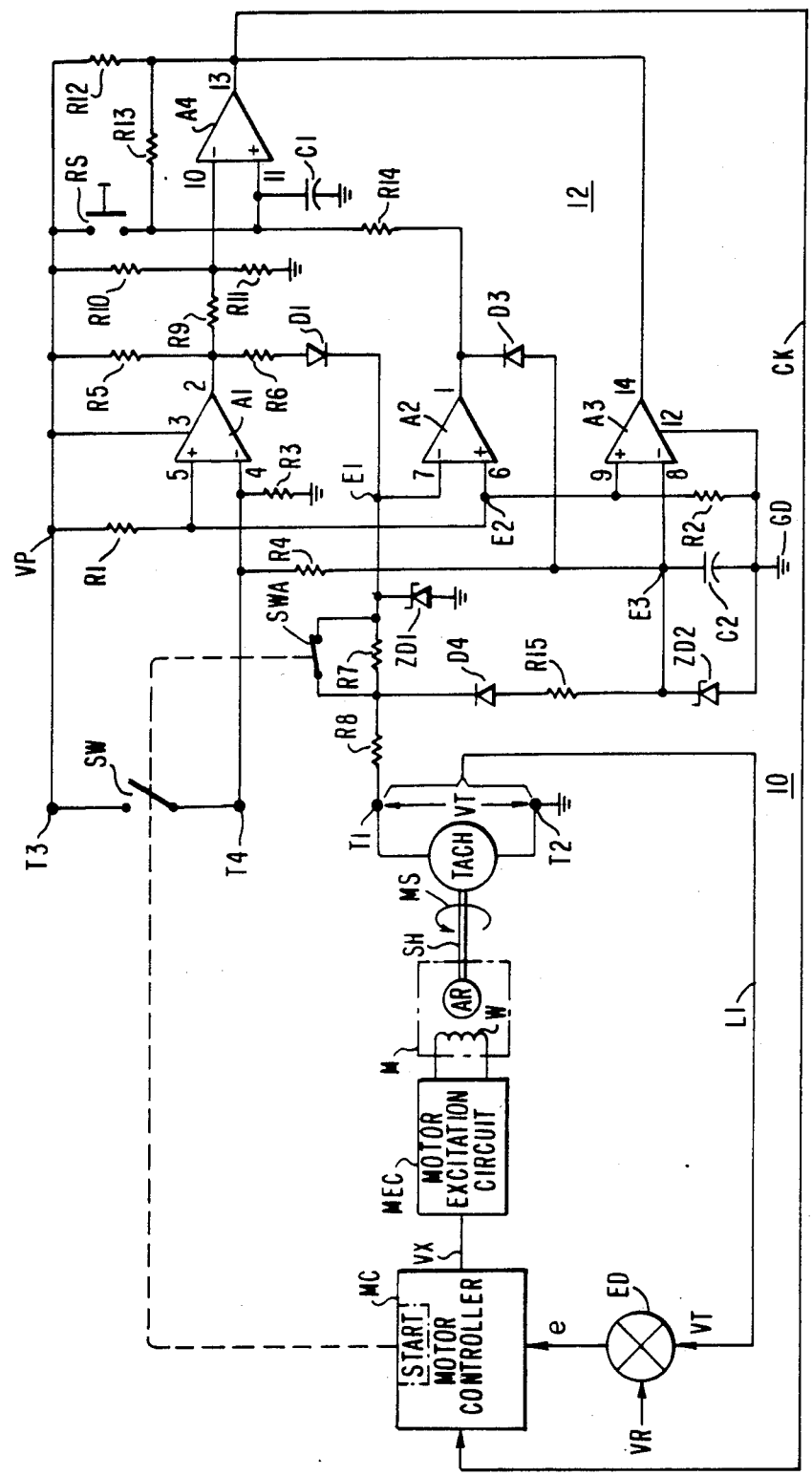
FIG. 2 shows an embodiment similar to that shown with respect to FIG. 1 but for an AC tachometer or a bidirectional DC tachometer.

Referring now to FIG. 2, a second embodiment of the invention is shown for utilization with an AC tachometer or a DC tachometer with bidirectional motor rotation. With respect to the embodiment of FIG. 2 if the tachometer in question is a DC tachometer which provides an output voltage which increases linearly with speed in the positive direction when the tachometer is rotating in one direction and which increases linearly with speed in the negative direction when the tachometer is rotating in the other direction, the operation is similar to that described with respect to the embodiment of FIG. 1. For the AC tachometer case, a switch SWA is disposed across the resistor R7. The switch SWA may be connected in ganged or similar relationship with the switch SW so that when the switch SWA is closd, the switch SW is opened and when the switch SWA is opened, the switch SW is closed. Furthermore, a diode D4 is connected at the cathode thereof to the junction between the resistor R8 and the resistor R7. The anode of that diode is interconnected with one side of a resistive element R15, the other side of which is connected to the top portion of the capacitive element C2 which represents the voltage at E3 or the inverting input terminal "8" of the comparator A3. Also connected to this point is the cathode of a zener diode ZD2, the anode of which is connected to ground GD. When the voltage at the regulating terminal of the zener diode is positive, the zener diode ZD2 will regulate to approximately 6.2 volts in a preferred embodiment of the invention, and when the voltage across the zener diode ZD2 is negative, the zener diode will act as a normal diode having a normal voltage drop thereacross which will be clamped to approximately −0.7 volts as the voltage thereacross attempts to become more negative. For the standstill test the switch SWA is closed, therefore performing generally the same function that the diode D2 did with respect to the embodiment of FIG. 1. In essence, therefore, the standstill test is generally almost exactly the same as that described with respect to the embodiment of FIG. 1. During the running test the switch SWA is opened and if the tachometer TACH is providing positive output voltage, the diode D4 becomes reverse biased, thus taking the resistive element R15 out of the circuit. The zener diode ZD2 remains in the circuit to regulate the positive voltage across the capacitive element to 6.2 volts should it increase to that level. Consequently, as long as the DC tachometer is operating in the positive range, the check circuit will operate generally the same as that described with respect to the embodiment of FIG. 1. If, on the other hand, the rotation of the tachometer changes to the opposite direction, the new embodiment represented by the circuitry of FIG. 2 when utilized with the appropriate parts of the circuitry of FIG. 1 will operate slightly differently. As the switch SW is closed and the switch SWA is opened, it can be seen that the voltage at E1 will not be positive. As VT becomes increasingly negative, ZD1 will limit E1 to approximately −0.7 V. Consequently, the output status of the inverter A2 will not change. It will remain high. This means that the diode D3 will perform no function in the timing operation to determine if the tachometer is operating properly or not. However, a timing operation will occur, that is the comparator A3 will switch from a high state to a low state if the voltage at E3 exceeds 2.5 volts. The capacitive element C2 will allow voltage at E3 to change as a function of a voltage divider formed by the resistive element R4 acting in conjunction with the resistive element R15. The resistive element R4 has been connected at one end thereof to the power supply voltage VP via SW, whereas the resistive element R15 is connected by way of the now positively biased diode D4 to the terminal T1 of the tachometer TACH. The voltage on the tachometer TACH may range anywhere from 0 to ±200 volts DC depending upon how long the switch SWA has been closed and the reliability of the tachometer TACH. In the preferred embodiment of the invention, the value of the resistive element R15 is approximately 150,000 ohms, whereas the value of the resistive element R4 is approximately 420,000 ohms. This provides a voltage divider arrangement for voltage at E3 of approximately 1 to 3, or one-third. If the tachometer is in a failure mode, that is, if it is not producing an output voltage VT, which rises with any great degree of rapidity, it can be seen that the capacitor C2 will be charging to a value of approximately $3\frac{1}{4}$ volts positive as a function of the RC time constant formed by the capacitive element C2 and the appropriate interconnection of the resistive elements R15 and R4. Within a very short period of time the value of voltage at E3 will exceed the value of voltage at E2 and the comparator A3 will switch state from high to low, indicating a failure mode as described previously. If, however, tachometer TACH reaches a relatively high negative value quickly, the timing for the switchover therefore is provided by a race between how fast the capacitor C2 can charge to the voltage potential at E3 which is greater than the voltage at E2 as a function of the previously described time constant versus how quickly the negative value of the tachometer voltage can exceed a value which would not allow the value at E3 to be greater than the value at E2. As an example, if VP is equal to 15 volts, R4 is equal to 420 kilohms and R15 is equal to 150 kilohms, E3 will not reach a value of 2.5 volts positive once the value of VT reaches approximately −2 volts negative. A fully charged capacitor C2 will cause the voltage at E3 to be less than that at E2 and consequently comparator A3 will have no opportunity to change state. If the tachometer is of the type which charges to 200 volts full scale in approximately 20 seconds, it can be seen that that tachometer will reach −2 volts in about one-fifth of a second. As long as the charging time of capacitor C2 is larger than one-fifth of a second, comparator A3 will not change state.

The tachometer check circuit arrangement shown with respect to FIG. 2 may be also utilized with an AC tachometer, that is, a tachometer that provides an output alternating voltage, the peak-to-peak value of which increases in relationship or in proportion to the speed of the tachometer. When the tachometer TACH is of the type which produces an AC signal which is related to the speed of the tachometer, the diode D3 is no longer necessary and may be disconnected. The output of the comparator A2 will vary as the voltage at E1 repeatedly changes from a value less than that at E2 to a value greater than that at E2, and so on. Consequently, the diode D3 is removed from the circuit for the AC operation. When the switch SW is closed, the switch SWA opens, the circuit 12 then operates essentially the same as it did with respect to the previously described embodiment involving a bidirectional DC tachometer. In this case, however, the capacitive element C2 and resistive elements R4, R15 are chosen such that the time constant for charging the capacitor C2 is significantly longer than the period of the AC voltage VT. Consequently, the capacitive element C2 essentially acts as an integrator. It will be noted that the diode D4 is chosen so that the positive half-cycles of the AC voltage from the tachometer TACH are not provided to the capacitive element C2 because the diode D4 becomes reverse biased. Consequently, only the negative half-cycles influence the value at E3 because of interaction with the capacitive element C2. The integrating characteristic of the capacitive element C2 is such that the negative half-cycle is averaged over an entire AC cycle so that it appears that a negative voltage which represents the average over a full wave of the negative half-cycle exists at the terminal T1. A peak negative value of approximately −7 volts will produce approximately 2.5 volts at E3 which, as was described previously, is in this embodiment the voltage which will cause the status of the comparator A3 to change from high to low, thus giving an indication of an error. Consequently, if the tachometer TACH can produce a peak voltage of higher than −7 volts before the capacitive element C2 completely charges, no indication of a failure will be provided. This is proper because it is anticipated under circumstance that the tachometer is functioning properly in the run state.

Figure 3:
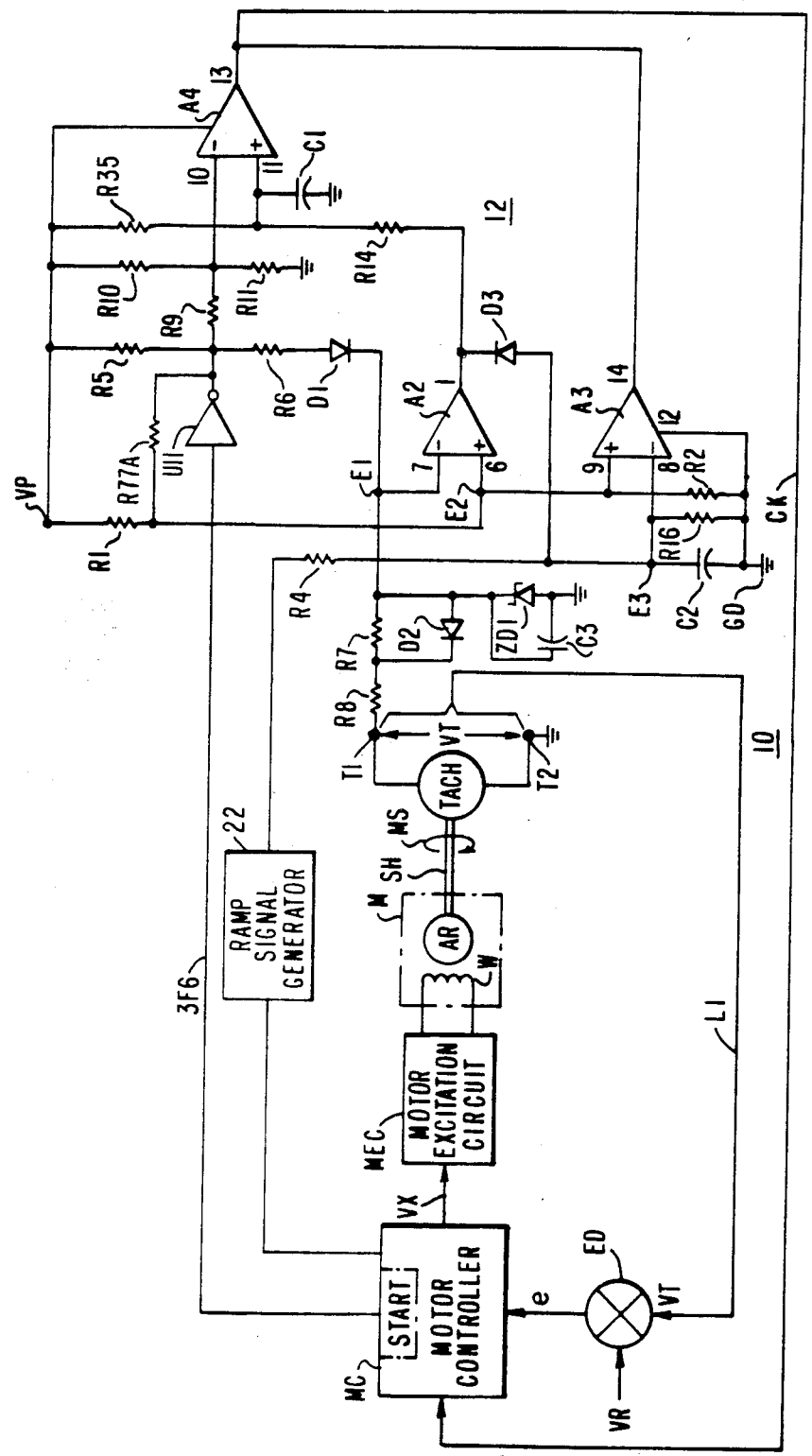
FIG. 3 shows an embodiment similar to that of FIG. 1 utilizing a ramp signal generator.

Referring now to FIG. 3, still another embodiment of the invention, similar to that of FIG. 1, is shown. In this embodiment of the invention, reset switch RS, resistive element R12, resistive element R13, resistive element R3, comparator A1 and terminals T3 and T4 are deleted. A new resistive element R35, which performs some of the function originally provided by resistive elements R12 and R13, is added between the power supply terminal VP and the non-inverting input terminal of the comparator A4. The switch SW, which is interconnected with the terminals T3 and T4 of the embodiment of FIG. 1, is replaced by an electronic signal controlled by line 3F6. This signal is provided to the input of an inverter U11, the output of which is connected to the junction between the resistive elements R5, R6 and R9 as was the case previously with respect to the comparator A1. Furthermore, resistive element R77A is fed back from this latter junction point to the lower side of the resistive element R1. Resistive element R4 is now fed by way of an electronic circuit 22 to the motor controller MC. When the motor controller MC is actuated in the start mode, the electronic circuit 22 provides a ramp voltage signal for utilization in charging the capacitive element C2. Capacitive element C3 is connected in parallel circuit relationship with the zener diode ZD1 and resistive element R16 is connected in parallel circuit relationship with the capacitive element C2. All of the other elements in the circuit of FIG. 3 are similar to corresponding elements in FIG. 1 and cooperate with the new elements to perform essentially the same functions as were provided previously with respect to the embodiment of FIG. 1. In operation, if the signal on the input line 3F6 is low, that represents a static test state and is caused by the motor controller being in the nonstart disposition and essentially the non-rotational status test is conducted. This places the output of the inverter U11 in the high state and thus provides an electrical current path from the voltage source VP by way of the inverter U11 through the diode D1, the resistive element R6 and the diode D2. This produces the previously described test voltage signal at E1. Note that when the inverter U11 is in the high state, resistive element R77A is put in parallel with resistive element R1 and in series circuit relationship with resistive element R2 forming a voltage divider for the voltage VP. This is the aforementioned E2 voltage signal. The combination of those resistive elements is chosen in this embodiment of the invention to make the voltage at E2 about 8½ volts. As long as the voltage at E1 is less than that at E2, the output of the comparator A2 will be high, thus providing a high input signal on the non-inverting input terminal of the comparator A4, thus providing the high output signal on the check line CK for feedback to the motor controller MC. If the value at E1 were to go higher than the value at E2, which would be indicative of an open circuit for the tachometer TACH, then the output of the comparator A2 would switch to a low state, thus causing the output of the comparator A4 to go to a low state because of the difference between the voltage on the inverting and non-inverting terminals thereof. This would then provide the low output signal on the check circuit line CK which would alert the motor controller MC that there is a problem with the tachometer TACH. When the motor starter is in the start condition, the output from the electronic control circuit 22 is low, thus causing the diode D3 to be reverse biased and also causing the signal at E3 on the inverting terminal of the comparator A3 to be low, thus causing the output of the comparator A3 to be high in a manner discussed previously with respect to the embodiment of FIG. 1. Once the static test has been completed and a start is initiated in the motor controller MC, the signal on line 3F6 goes high and the electronic module 22 begins to provide an ever-increasing ramp signal on the upper end of the resistive element R4. When the signal on the input of the inverter U11 goes high its output goes low, thus providing that the voltage signal on the inverting terminal of the amplifier A4 is lower than any possible value of the voltage signal on the non-inverting terminal thereof. This makes the output of the comparator A4 high, thus placing control of the check line CK on the output of the comparator A3. Note that when the output of the inverter U11 goes low, the resistive element R77A is placed in parallel with the resistive element R2. This drops the voltage on pin "9" of inverter A3 to about 2 volts. That is, the value of voltage at E2 is approximately 2 volts. Again a race is set up between the comparator A2 and the comparator A3. If the tachometer voltage, that is the voltage at E1, exceeds the voltage at E2 before the voltage at E3 exceeds the voltage at E2, the diode D3 will become forward biased because the output of the comparator A2 will go low. This will prevent further charging of the capacitive element C2, thus preventing the voltage at E3 from exceeding the voltage at E2, thus preventing a low output on the comparator A3. The ramp signal out of the electronic circuit 22 is programmed to cause a switchover on the output of the inverter A3 when the ramp signal reaches approximately 8 volts. If when the ramp signal reaches 8 volts and the diode D3 has not been forward biased by the output voltage VT of the tachometer TACH, then an unsafe indication will be given on the check line CK.

I claim:

1. A speed-controlled motor system, comprising:
   (a) electric motor means with a rotating member for driving a load at a predetermined angular velocity;
   (b) motor controller means interconnected with said electric motor means for causing said rotating member to rotate at said predetermined angular velocity when actuated;
   (c) tachometer means with output voltage terminal means interconnected with said rotating member for generating a tachometer means output voltage at said output voltage terminal means which is indicative of the angular velocity of said rotating member, said tachometer means being interconnected at said output voltage terminal means with said motor controller means for providing said tachometer means output voltage thereto for being utilized by said motor controller means to maintain the angular velocity of said rotating member at said predetermined angular velocity within limits; and
   (d) combination motor control starter and tachometer checker means interconnected with said tachometer means output voltage terminal means and said motor controller means for simultaneously actuating said motor controller means to cause said rotating member to rotate and initiate a tachometer means check to stop said rotating member from continued rotation if a minimum output check voltage value is not present at said output voltage terminal means at a predetermined time after said motor controller means has been actuated, comprising:
      (i) a power supply means;
      (ii) voltage time delay means for providing an output feedback signal at the end of said predetermined time unless sooner disabled at a disable terminal thereof;
      (iii) disable comparator means interconnected at the input thereof with said tachometer means output voltage terminal means and connected at the output thereof within said voltage time delay means for providing a disabling condition for said voltage time delay means when the voltage on said output voltage terminal means exceeds said minimum output check voltage; and (iv) switch means connected at one pole thereof between said power supply means and said voltage time delay means and connected at another pole thereof with said motor controller means for simultaneous actuation of said motor controller means and connection of said power supply means to said voltage time delay means so that said output feedback signal will be provided after said predetermined time unless sooner disabled, said disabling occurring if said minimum output check voltage is reached before the end of said predetermined time.

* * * * *